J. MURGAS.
WIRELESS TELEGRAPHY.
APPLICATION FILED MAY 17, 1907.
915,993.
Patented Mar. 23, 1909.
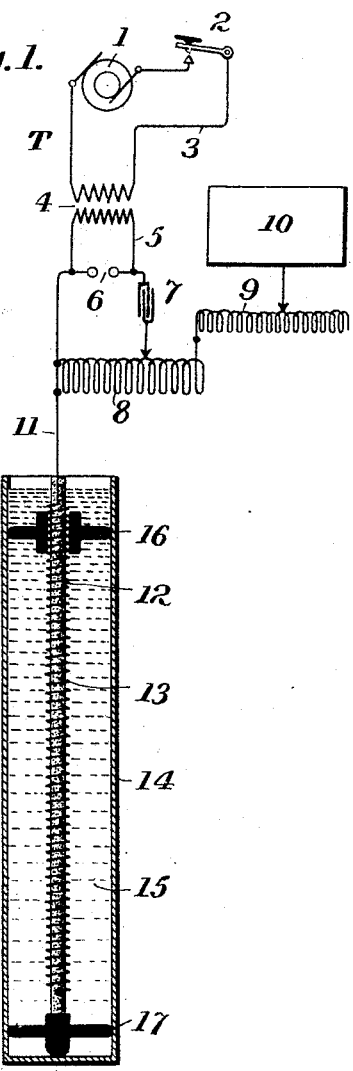
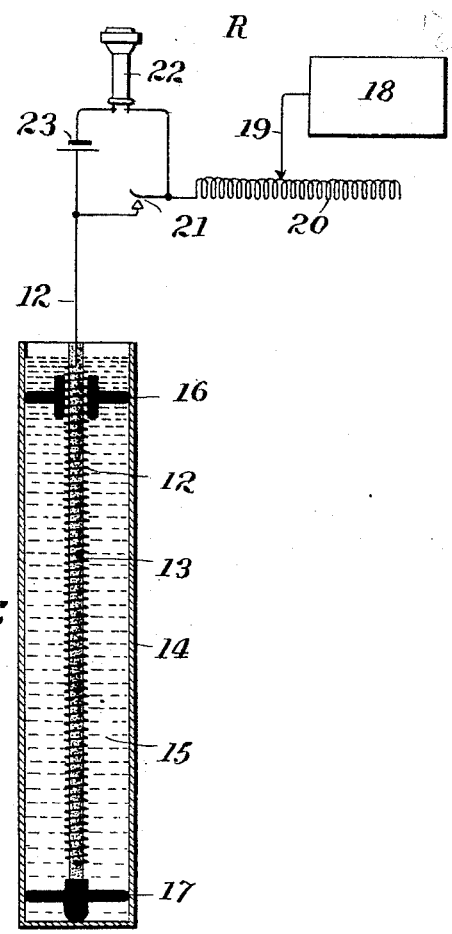
Witnesses
Inventor
Joseph Murgas
By Foster Freeman Watson & Coit
Attorneys

UNITED STATES PATENT OFFICE.

JOSEPH MURGAS, OF WILKES-BARRE, PENNSYLVANIA.

WIRELESS TELEGRAPHY.

No. 915,993.      Specification of Letters Patent.      Patented March 23, 1909.

Application filed May 17, 1907. Serial No. 374,231.

*To all whom it may concern:*

Be it known that I, JOSEPH MURGAS, a citizen of the United States, and resident of Wilkes-Barre, Luzerne county, State of Pennsylvania, have invented certain new and useful Improvements in Wireless Telegraphy, of which the following is a specification.

This invention relates to improvements in wireless telegraphy, the object of the invention being to provide means whereby oscillatory impulses are more vigorously propagated and more distinctly received than heretofore, and whereby earth currents, unless distinctly of an oscillatory character, have no influence upon the receiving apparatus.

The invention relates more particularly to improvements upon the apparatus illustrated and described in my Patent No. 860,051, granted July 16, 1907.

The invention will be described in connection with the accompanying drawing, in which, Figure 1 is a diagrammatic view of a transmitting station; and Fig. 2 is a similar view of a receiving station both embodying the invention.

In the application referred to the station apparatus is not connected to the ground. At the point in the apparatus at which the earth connection is usually made an antenna is connected, which antenna extends into the earth in a straight line, being however insulated from the earth. On the other side of each station apparatus a capacity is connected at the point where the aerial antenna is usually connected. In said application several forms of apparatus for transmitting and receiving are shown. Likewise, in the present case, any transmitting or receiving apparatus which can be employed in connection with the usual aerial antenna can be used. I have therefore illustrated but one form of each apparatus in the present case.

In experimenting with the apparatus illustrated in the patent mentioned, I observed that the earth is more susceptible of receiving and transmitting magnetic waves of low frequency than waves of high frequency. My present improvement is directed to rendering the apparatus equally sensitive to waves of any length and any frequency and also to reducing the length or depth of the well or hole for the antenna and therefore its cost. I accomplish these objects by coiling the antenna into a helix having an axis much shorter than the straight antenna of the application mentioned.

Referring to the accompanying drawing, T indicates the transmitting apparatus and R the receiving apparatus. The transmitting apparatus, as illustrated, comprises an alternating current dynamo 1, and a key or circuit closer 2 in the dynamo circuit 3. A transformer 4 induces a current in an oscillator circuit 5 having an air gap 6 and a condenser 7. The oscillator circuit is closed through an inductance 8 which is connected at one end with a balancing-inductance 9 and a capacity 10, and at the other end with a conductor 11 connecting it with an antenna 12 in the form of a helix. The antenna is suitably insulated from the earth E. As shown it is wound upon a rod 13 of insulating material which is held centrally in a tube 14 inserted in the ground. The tube is closed at its lower end and filled with oil 15 to prevent dampness from interfering with the insulation of the antenna. Spacing insulating devices 16, 17, may be used to hold the antenna centrally in the tube 14.

As illustrated, the receiving apparatus comprises a capacity 18 connected by a conductor 19 with an inductance 20. The antenna of the receiving station may be identical with the antenna of the transmitting station and I have therefore applied the same reference figures both to the antenna and its supporting and insulating means. Between the antenna and the capacity is connected a suitable wave conducting means comprising an imperfect contact 21 around which is a circuit including a telephone receiver 22 and a battery 23.

The tube 14 may be of metal or other suitable material and the helix may be insulated therein in any suitable manner. The inductances 8, 9, and 20, are adjustable, as described in the patent above referred to.

Without limiting myself to the precise construction and arrangement illustrated and described, what I claim as new and desire to secure by Letters Patent is:

1. Wireless station apparatus comprising an antenna upon one side of the apparatus extending into the earth and insulated from the latter, and a capacity upon the other side of the apparatus, the antenna being arranged in a curved line, for the purpose set forth.

2. Wireless station apparatus comprising an antenna upon one side of the apparatus extending into the earth and insulated from the latter, and a capacity upon the other side of the apparatus, the antenna being in the form of a helix, for the purpose set forth.

3. Wireless station apparatus comprising an antenna upon one side of the apparatus extending into the earth and insulated from the latter, and a capacity upon the other side of the apparatus, the antenna being in the form of a helix, and means for suitably insulating the antenna from the earth.

4. Wireless station apparatus comprising an antenna upon one side of the apparatus extending into the earth, a capacity upon the other side of the apparatus, and a tube or well sunk in the earth, the said antenna consisting in a helix arranged within said tube and insulated therefrom.

5. In a system for wireless transmission, the combination with transmitting apparatus, of receiving apparatus, each of said apparatus comprising an antenna suitably curved, extending into the earth and insulated from the latter, whereby its direct length from end to end is much less than its actual length.

6. In a system for wireless transmission, the combination with transmitting apparatus, of receiving apparatus, each of said apparatus comprising an antenna in the form of a helix extending into the ground and insulated from the latter.

7. Wireless station apparatus comprising an antenna upon one side of the apparatus extending into the earth and insulated from the latter, and a capacity upon the other side of the apparatus, the antenna having a length substantially greater than the distance between its ends.

In testimony whereof I affix my signature in presence of two witnesses.

JOSEPH MURGAS.

Witnesses:
JOHN P. POLLOCK,
GEO. W. LEURS.